United States Patent [19]

Krag

[11] Patent Number: 4,660,678

[45] Date of Patent: Apr. 28, 1987

[54] SERVICE SUSPENSION BASKET ARRANGEMENT

[75] Inventor: Gustav Krag, Stavanger, Norway

[73] Assignee: Spider A/S, Stavanger, Norway

[21] Appl. No.: 871,412

[22] PCT Filed: Sep. 27, 1984

[86] PCT No.: PCT/NO84/00040
§ 371 Date: May 19, 1986
§ 102(e) Date: May 19, 1986

[87] PCT Pub. No.: WO86/02121
PCT Pub. Date: Apr. 10, 1986

[51] Int. Cl.[4] .................. E04G 3/16; B66F 11/04; B62D 57/02
[52] U.S. Cl. .................. 182/14; 182/37; 182/63; 182/150
[58] Field of Search .................. 182/36, 37, 12, 13, 182/14, 150, 142, 143, 63, 82

[56] References Cited

U.S. PATENT DOCUMENTS

| 2,761,396 | 9/1956 | Harlan | 182/36 |
| 2,925,240 | 2/1960 | Laviolette | 182/36 |
| 2,930,441 | 3/1960 | Lacy et al. | 182/14 |
| 3,524,520 | 8/1970 | Tidwell | 182/36 |
| 3,908,792 | 9/1975 | Shortt | 182/37 |
| 4,201,275 | 5/1980 | Sinclair | 182/37 |
| 4,271,927 | 6/1981 | Brown | 182/36 |
| 4,276,959 | 7/1981 | Barber | 182/150 |

Primary Examiner—Reinaldo P. Machado
Attorney, Agent, or Firm—Kenyon & Kenyon

[57] ABSTRACT

The invention relates to a service suspension basket which is adapted to move on rails or similar mounting means which are secured on the under side of platform deck or on a similar, downwardly facing foundation, the service basket is supported via a number of join arm-formed, hydraulically pivotable support means with associated separate hydraulically operated catch claws on the rails or similar mounting means.

7 Claims, 15 Drawing Figures

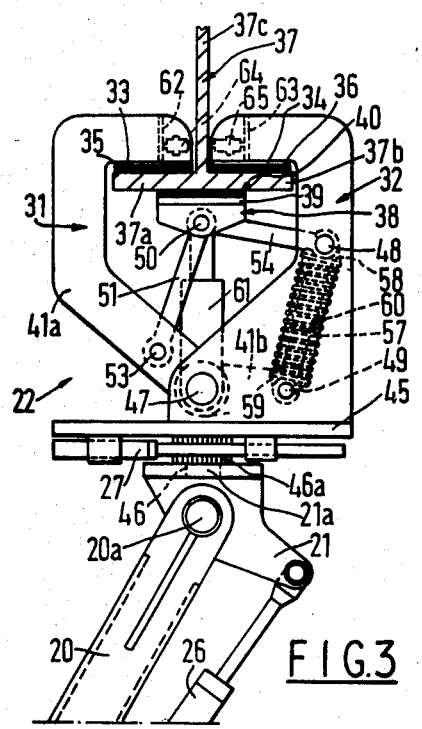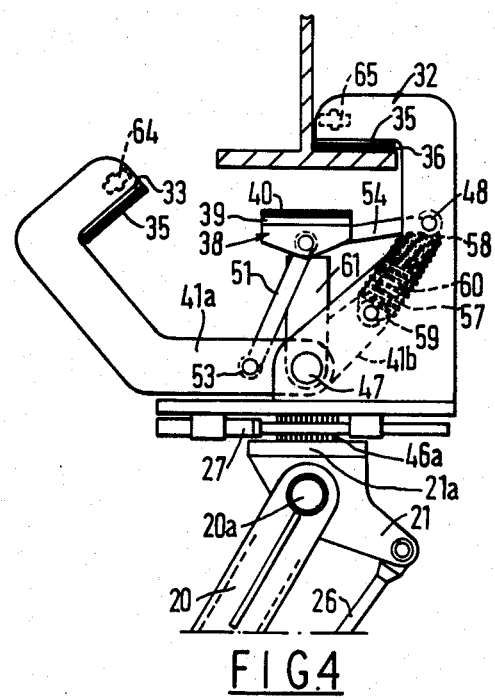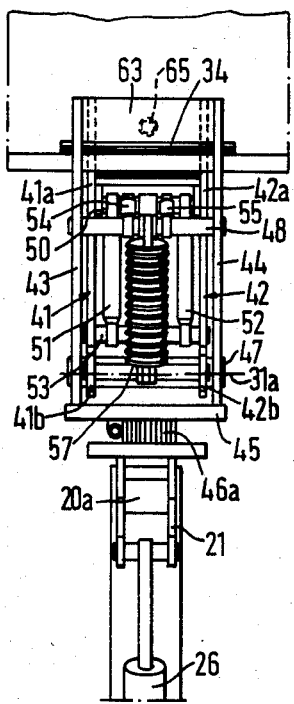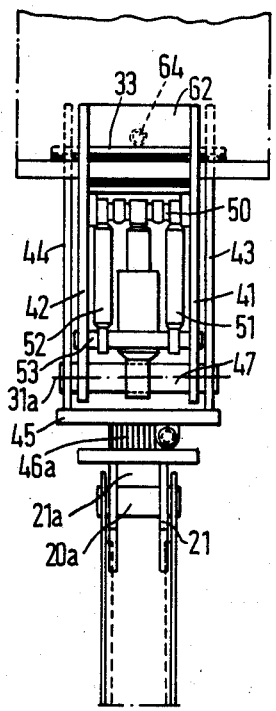

SERVICE SUSPENSION BASKET ARRANGEMENT

The present invention relates to a service suspension basket arrangement which is adapted to move on rails or on similar mounting means which are secured on a support ramp on an upwardly facing foundation and/or on rails or on similar mounting means which are secured on the under side of a platform deck or on a similar, downwardly facing foundation.

The service basket is particularly intended for use for inspection work, easier maintenance work together with repair work on installations (drilling rigs and the like) at sea in connection with oil and gas fields. It is especially appropriate to use the service basket on the under side of a deck, the so-called "cellar deck". However, it is also appropriate to use the arrangement on land installations.

With the present invention the aim is to be able to carry out the afore-mentioned service operations without using scaffolding and like constructions which are relatively cost demanding in purchase and in use and which in addition are time-demanding in connection with assembly and disassembly. The objective is thus a service basket which can be transferred in a relatively rapid and easy manner from storage location to use location and which by "self help" can take itself forwards to and backwards from different positions of interest on the under side of the deck or similar foundation in a relatively rapid and reliable manner.

The arrangement according to the invention is characterised in that the service basket is supported, via a number of joint arm-formed, hydraulically pivotable support means with associated separate hydraulically operated catch claws, on the said rails or similar mounting means, a feeler means or a pair of feeler means in each catch claw controlling the operation of the remaining catch claws and/or the support means of the remaining catch claws, so that when the one catch claw assumes an open or released position there is provision for the associated feeler means to block the operation of the remaining catch claws and/or support means of the remaining catch claws.

By means of the joint arm-formed, hydraulically pivotable support means with associated separate hydraulically operated catch claw one can according to desire allow the service basket to move along or across the associated rails or similar mounting means or from mounting means to mounting means, for example along the under side of a deck or a roof—or from a support ramp on an upwardly facing foundation to the under side of the deck or the roof—in a controlled manner. That is to say that by means of the said feeler means or pair of feeler means one can provide for movement of the support means with associated catch claws one at a time in a controlled and reliable manner. This makes it possible for an operator in the service basket to move the support means with catch claw in different directions and over different distances from rail to rail or from mounting means to mounting means or along the rail or the mounting means, while the remaining support means with associated catch claws maintain the basket in a controlled manner at its associated fixed location and with the service basket in one and the same position. Movements of the service basket can take place at a relatively slow tempo.

By services which are to be carried out below a platform deck, for example below a so-called "cellar deck", there are most often relatively large heights between said cellar deck and a so-called "spider deck" lying below. Often the distance in height is 10-12 meters. The aim in such instances is to allow the service basket in the starting position to rest on rails or similar mounting means on a support ramp which bears against the upwardly facing side of the spider deck. Thereby one can allow the basket to start its movement upwardly against the downwardly facing side of the cellar deck from a level (for example 2 m) above the spider deck. By way of the support means with associated catch claws, which can be operated one at a time, it is possible during the whole of the transfer operation constantly to maintain three of the four catch claws in secure engagement with associated rails or mounting means while the remaining catch claw shifts fastening grip. Provision is made for each support means in an outstretched condition to have a length of, for example, 4 m, and the service basket can then be lifted first four meters above the support frame and thereafter catch hold of the rails or mounting means of the cellar deck four meters above the basket.

Further features of the arrangement according to the invention will be evident from the following description having regard to the accompanying drawings, in which:

FIGS. 3 and 4 show a catch claw, seen from the side in respective closed and open positions in connection with a rail or similar mounting means.

FIGS. 5 and 6 show the catch claw according to FIG. 3 seen from the front side and from the back side, respectively.

Figure 1:
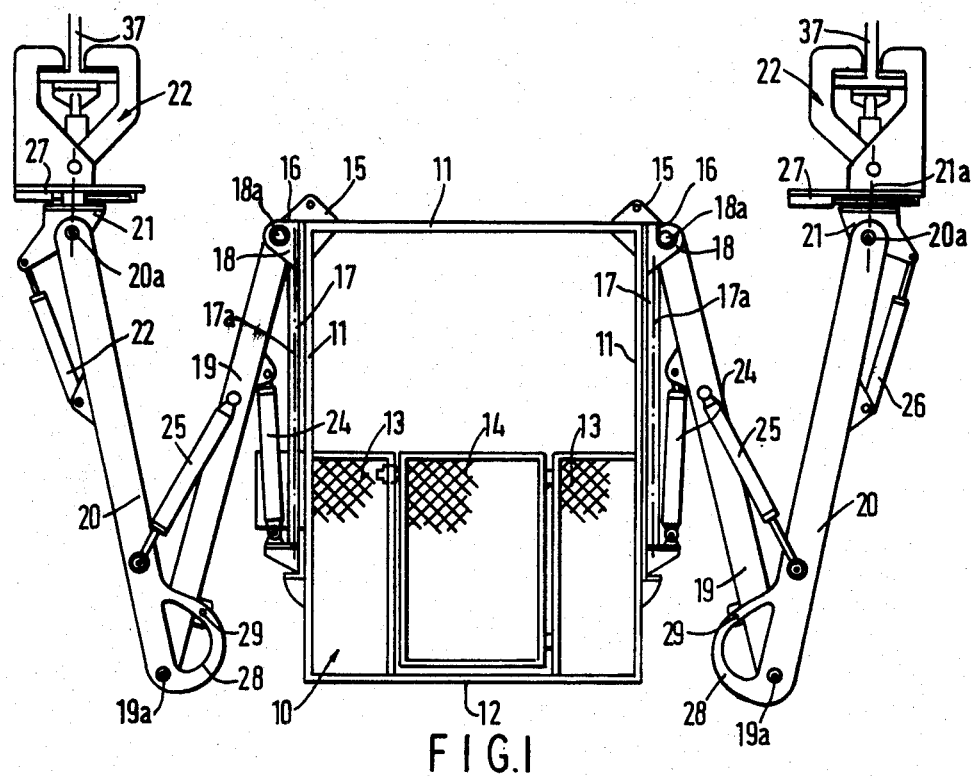
FIGS. 1 and 2 show the service basket with associated support means and catch claws illustrated from the side and from above, respectively.
Figure 2:
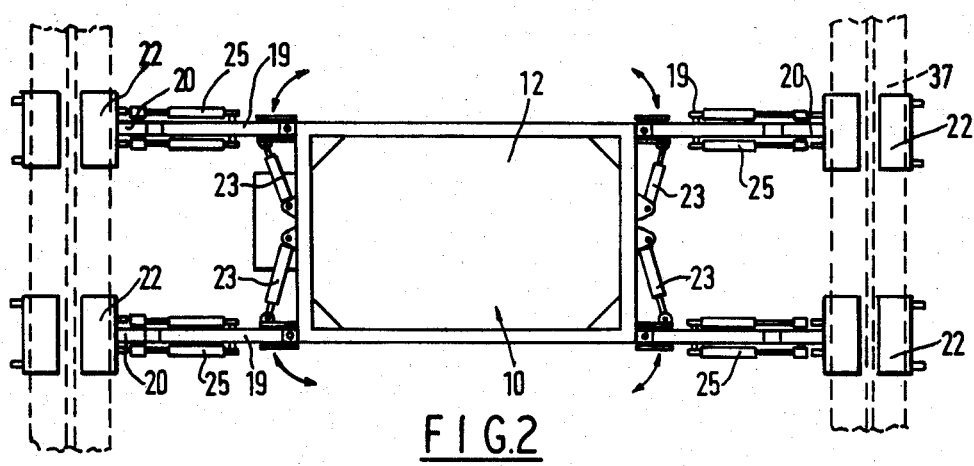

In FIGS. 1 and 2 there is illustrated a service basket 10 with space for, for example, two men, that is to say a trained and authorised driver and an operator for carrying out inspection, repairs, maintenance and the like. The basket 10 is provided with a box-shaped tubular framework 11 having a closed bottom 12 with a protective fence on for example three of the sides and protective fence 13 with associated gate 14 on the fourth side. The upper half of the service basket is without fence and is without covered roof, but has a roof frame in order to prevent persons in the basket from being pressed too high upwards against the under sides of a deck or roof. At the top of the basket 10 there are arranged fastening ears 15 for lifting straps with associated lifting hooks (not shown further) for handling the basket with lifting crane or similar lifting equipment.

At each of the four corners of the basket there is pivotably mounted about a vertical axis 17a between the fastening ears 15 and fastening brackets 16 lying below a pivot shaft 17. At the upper end of the pivot shaft 17 there is formed a "shoulder joint"-forming pivot bearing, and there is pivotably mounted about a first horizontal axis 18a in a bracket 18 the one end of a first joint arm or a so-called "upper arm" 19. At the opposite end the first joint arm 19 is linked via another horizontal elbow joint-forming pivotal axis 19a to another joint arm or so-called "forearm" 20. The opposite end of the joint arm 20 is via a so-called "hand joint"-forming pivot bearing having a third horizontal pivotal axis 20a linked with a support bracket 21 which via a transverse pivot axis 21a supports pivotably mounted an associated catch claw 22. Between the basket 10 and the pivot shaft 17 there is inserted a first hydraulic pressure cylinder 23. Further between the lower end of the pivot shaft 17 and one (inner) end portion of the arm 19 there is inserted another hydraulic pressure cylinder 24. Between said one (inner) end portion of the arm 19 and a corresponding one (inner) end portion of the arm 20 there is inserted a third hydraulic pressure cylinder 25. Correspondingly, there is inserted between the other (outer) end portion of the other arm 20 and the support bracket 21 a fourth hydraulic pressure cylinder 26, while between the support bracket 21 and the catch claw 22 there is inserted a fifth hydraulic pressure cylinder 27. On said one (inner) end portion of the arm 20 there is fixed a control bow 28 which cooperates with a feeler means 29 fixed to the first arm 19. Immediately the connection between or the contact between the control bow 28 and the feeler means 29 is locally broken, the third pressure cylinder 25 is prevented from further drawing out the associated piston rod, so that an automatic stopping can be obtained of the mutual pivoting of the arms 19, 29 beyond a particular angle and thereby ensure against maximum stretching out of the angle between the arms 19, 20. If desired, the feeler means at such a maximum swinging out of the arms 19, 20 can provide for the interruption of all further movement of the combined pressure cylinders 24–27, until normal working conditions are established by means of controlling associated control valves.

In FIG. 3 there is shown the catch claw 22 in a closed position and in FIG. 4 in an open position. The catch claw 22 comprises a first clamp member 31 which is pivotably mounted about a transverse axis 31a on a stationary clamp member 32. The outer end of the clamp member 31 and the outer end of the clamp member 32 are respectively provided with support plates 33, 34 with associated friction-promoting coatings 35, 36. The support plates 33, 34 with associated coatings 35, 36 form support abutments against the upper side of oppositely directed lower flanges 37a and 37b on an I-shaped rail 37 (only the lower portion is shown in FIGS. 3–6), that is to say on each side of the central web 37c of the rail. A third clamp member 38 is provided with a support plate 39 with an associated friction-promoting coating 40, which forms a support abutment against the under side of the flanges 37a, 37b.

The clamp member 31 is constructed of two mutually parallel plate members 41, 42, which are each in the form of a two-branched lever and which comprise a main branch 41a and 42a and an auxiliary branch 41b and 42b. The clamp member 32 is correspondingly constructed of two mutually parallel plate members 43, 44, one end of which is rigidly connected to a fastening plate 45 which is supported by a pivot 46 which is turnably mounted about the axis 21a in the support bracket 21. The pivot 46 is provided with a gear rim 46a which cooperates with a rack in the pressure cylinder 27. Opposite ends of the plate members 43, 44 are rigidly connected to each other via the support plate 34. In addition, the plate members 43, 44 are rigidly connected to each other by means of two shaft pins 47 and 48. The pivotal axis of the shaft pin 47 corresponds to the pivotal axis 31a of the clamp member 31, the clamp member 31 being pivotably mounted on the shaft pin 47 in the intermediate space between plate members 43, 44 of the clamp member 32. Plate members of the clamp member 31 are rigidly connected to each other at the outer end of the main branch 41a and 42a via the support plate 33, while the plate members are connected to each other at the outer end of the auxiliary branch 41b and 42b by means of a shaft pin 49. The clamp member 38 supports via two ears 38a and 38b a shaft pin 50. The shaft pin 50 is linked by means of a first pair of support rods 51, 52 to a shaft pin 53 which extends between the plate members 41, 42 in the clamp member 31 at the inner portion of the main branch 41a and 42a, while the shaft pin 50 is linked by another pair of support rods 54, 55 with the shaft pin 48 on the clamp member 32. Between the shaft pin 48 on the clamp member 32 and the shaft pin 49 on the clamp member 31 there is inserted a compression spring 57 between spring abutments 58, 59, and centrally within the compression spring there is inserted a hydraulic pressure cylinder 60. Between the shaft pin 50 in the clamp member 38 and the shaft pin 47 in the clamp member 32 there is inserted a telescopically collapsible control pin 61.

The opening and closing of the catch claw, that is to say the adjustment of the clamp members 31 and 38 from the position shown in FIG. 3 to the position shown in FIG. 4, and vice versa, occurs by means of the hydraulic pressure cylinder 60. In the position illustrated in FIG. 3 the pressure cylinder 60 via the support rods 51, 52 provides for the clamping of the clamp member 38 against the under side of the rail 37 at the same time as the clamp member 31 is clamped against the upper side of the flange 37a. The pressure cylinder 60 has as shown in FIG. 4 provision for pivoting the clamp member 38 as well as the clamp member 31 away from the rail 37, while the clamp member 32 still rests against flange 37b of the rail 37. After the clamp members 31 and 38 are released from the rail 37, as shown in FIG. 4, the clamp member 32 can finally be unhooked from the rail 37.

As shown in FIGS. 3, 5 and 6, the clamp members 31 and 32 support their respective plate pieces 62 and 63 equipped with respective feeler means 64, 65, which are activated when the clamp members 31, 32 assume the position which is shown in FIG. 3. On activating the feeler means 64, 65 a signal is emitted to a control panel (not shown further) which indicates that the engagement of the catch claw 22 is secure. The control panel can in addition to warning lamps and other display arrangements be provided in the usual way with manually operable levers or push buttons for control valves and the like. In cases of power failure or drop of working pressure on the pressure cylinder 60 the compression spring 57 will immediately take over and safeguard placing the catch claw in the position which is illustrated in FIG. 3.

The signal which is emitted from the feeler means 64, 65 is of considerable significance in ensuring that one gets a controlled handling of the basket. Immediately one opens the one catch claw, the feeler means 64, 65 emit a control signal to the control panel, whereby handling of the remaining catch claws is blocked until the opened catch claw has once again assumed a fresh, controlled engagement and has emitted a signal for this via the feeler means 64, 65.

In the basket 10 there can be arranged corresponding feeler means 66, 67 which oversee that the gate 14 in the basket is closed and which by correspondingly giving a signal ensure that none of the catch claws can be actuated before the gate is closed. Corresponding feeler means (not shown further) can also be arranged in order to sense that the basket at any time has a horizontal position and in order to block further handling of the basket until the horizontal position is reestablished.

In FIGS. 7-15 there are shown various movements which can be effected with the basket and its joint arms and associated catch claws.

Figure 7:
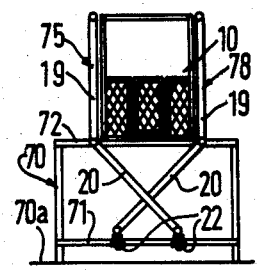
FIGS. 7-15 show schematically different positions which the service basket assumes during transfer of the latter from a parked position on an upwardly facing foundation to a service position on a downwardly facing foundation.

In FIG. 7 the basket 10 is shown in an inactive, parked position on a stand-forming support ramp 70 on an upwardly facing deck 70a (spider deck). The support ramp 70 is provided with a pair of lower rails or mounting means 71 and a pair of upper rails or mounting means 72. In FIG. 7 the basket is shown resting against upper mounting means 72 of the support ramp, while four joint arm-formed support means 75-78 of the basket are pivoted downwards and by means of associated catch claws 22 are fastened to the lower mounting means 71, 72. The support means 75-78 each consist of a pair of arms (upper arm and forearm) corresponding to the arms 19, 20 with associated pivot shaft 17, support bracket 21 for a catch claw 22, such as described with reference to FIGS. 1 and 2.

Figure 8:
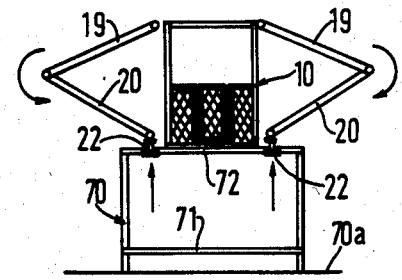

In FIG. 8 the basket 10 is shown after the support means 75-78 via associated catch claws 22 have assumed in turn and order and separately a fresh grip on the upper mounting means 73, 74 of the support ramp 70.

Figure 9:
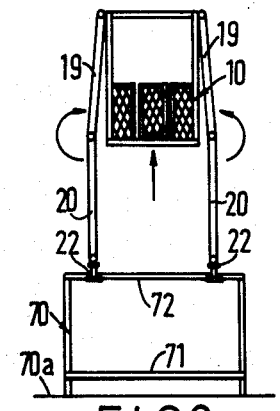

In FIG. 9 the basket 10 is shown after the support means 75-78 are stretched out in concert by synchronous movement of associated pressure cylinders in the support means 75-78. So long as all the catch claws 22 are in permanent, controlled engagement (inspected by the feeler means 64, 65) with associated mounting means or rails, the combined support means can be controlled synchronously with a corresponding pattern of movement in order to move the basket in a vertical or horizontal direction where this is appropriate.

Figure 10:
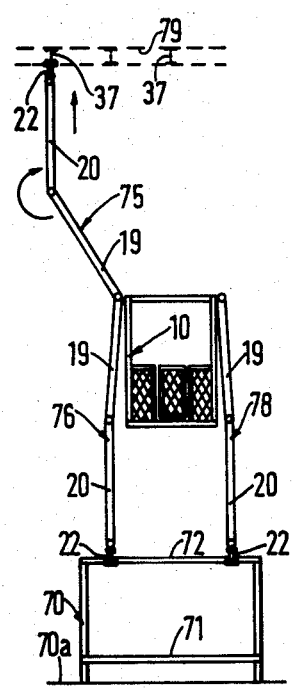

In FIG. 10 there is illustrated the one support means 75 shown raised upwards for engagement with a rail 37 on the under side of a downwardly facing deck 79 (cellar deck). There are shown a series of mutually parallel rails 37 with a suitably large intermediate space of, for example, about 90 cm in a case where each joint arm 19 and 20 in each support means 75-78 has a length of about 200 cm.

Figure 11:
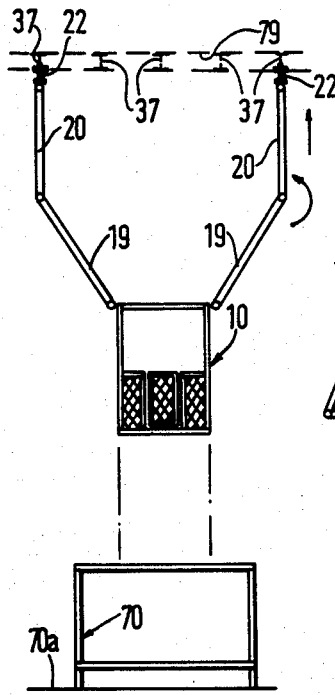
Figure 12:
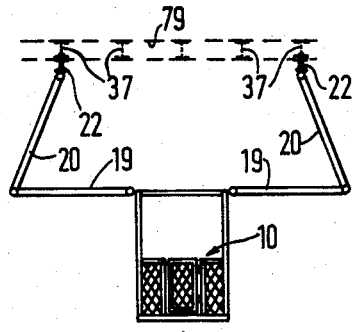

In FIG. 11 the basket 10 is shown after the latter is suspended via all of its four support means 75-78 in associated rails 37 in the deck 79, and in FIG. 12 the basket is shown after it is raised upwards to a suitable level for horizontal movement of the basket on the under side of the deck 79. In FIG. 12, the support means 75-78 are shown in a position with the "shoulder joint" of the support means closed off at a 90° angle to the basket, that is to say with the "upper arm" 19 extending horizontally outwards from the basket. In this starting position the "forearm" 20 of the support means extends obliquely upwards and inwards towards associated rails 37 in which they are fastened with associated catch claw or "hand" 22.

Figure 13:
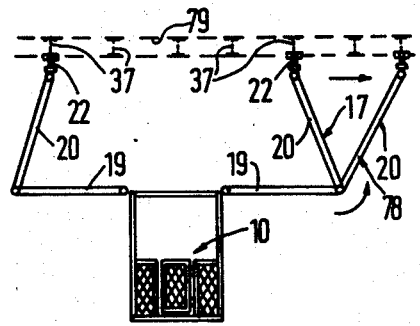
Figure 14:
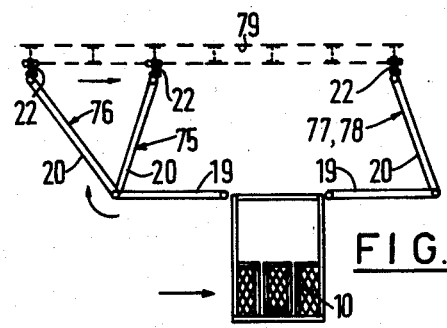

In FIG. 13 there is shown a first stage of the movement of the basket 10 across the deck 79, that is to say from rail 37 to rail 37, the one forearm 20 being pivoted outwardly into fresh engagement with a parallel rail. Thereafter a second forearm 20 is pivoted in a corresponding manner into engagement with the same said parallel rail. Finally the basket is pivoted sideways to the position which is shown in FIG. 14, and thereafter in turn and order, as indicated in FIG. 14, one subsequently pivots a forearm of a third and a fourth support means with associated catch claws laterally into fresh engagement with a new, parallel rail to a position corresponding to FIG. 12. Correspondingly one can continue laterally from rail to rail over the whole extent of the deck 79 in the transverse direction. Similar movements can also be effected along the rails 37, that is to say in the longitudinal direction of the deck, there being effected in such an instance a grip shift for a catch claw one at a time and in a particular pattern in a manner similar to that described above for the movement in the transverse direction, the only difference being that the arms are pivoted sideways about a vertical axis instead of exclusively about horizontal axes as described above.

Figure 15:
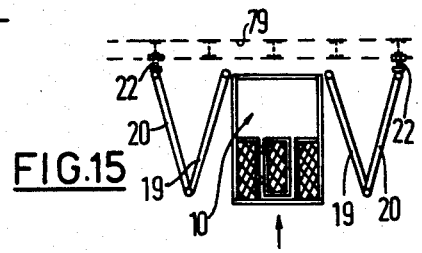

In FIG. 15 the basket 10 is shown in a typical service position after the basket has been lifted upwards to a position just below the rails 37 in the deck 79.

I claim:

1. Service suspension basket arrangement (10) which is adapted to move on rails or on similar mounting means (71, 72) which are secured on a support ramp (70) on an upwardly facing foundation and/or on rails (37) or on similar mounting means which are secured on the under side of a platform deck (79) or on a similar, downwardly facing foundation, characterized in that the service basket (10) is supported, via a number of joint arm-formed, hydraulically pivotable support means (75-78) with associated separate hydraulically operated catch claws (22), on the said rails (37) or similar mounting means (71, 72), a feeler means or a pair of feeler means (64, 65) in each catch claw (22) controlling the operation of the remaining catch claws and/or the support means of the remaining catch claws, so that when the one catch claw assumes an open or released position there is provision for the associated feeler means to block the operation of the remaining catch claws and/or support means of the remaining catch claws.

2. Arrangement in accordance with claim 1, characterized in that the support means (75-78) comprise a first joint arm ("upper arm" 19) which with a shoulder joint-forming pivot bearing is linked to the upper portion of the service backet (10) via a vertical pivotal axis together with a first horizontal pivotal axis (18a) and another joint arm ("forearm" 20) which is linked with an elbow joint-forming horizontal pivotal axis (19a) to the first joint arm (19) and with a hand joint-forming pivot bearing is linked to the associated catch claw (22) about a third horizontal pivotal axis (20a) and a pivotal axis (21a) which extends across the third pivotal axis (20a), a first hydraulic cylinder (23) between the basket (10) and a pivot shaft (17) in the shoulder joint-forming pivot bearing controlling the pivoting of the associated support means (75-78) with associated catch claws (22) about the vertical pivot axis (17a), while another hydraulic cylinder (24) between the pivot shaft (17) and the first arm (19) and a third hydraulic cylinder (25) between the first arm (19) and other arm (20) together with a fourth hydraulic cylinder (26) between the other arm (20) and a support bracket (21) for the catch claw (22) control the movement of the catch claw towards and away from and upwards and downwards respectively in relation to the basket (10), and a fifth hydraulic cylinder (27) between the support bracket (21) and the catch claw (22) controls the movement of the catch claw in relation to a cooperating rail or similar mounting means.

3. Arrangement in accordance with claim 2, characterized in that there is arranged between the first arm (19) and other arm (20) a feeler means (29) for sensing a maximum outwards pivotal angle between the arms (19, 20) and for emitting a signal for preventing pivoting of the arms (19, 20) beyond a particular maximum outward pivotal angle.

4. Arrangement in accordance with one of claims 1-3, characterized in that the catch claw (22) comprises a first clamp member (31) which is pivotably mounted about a transverse axis (31a) on the other clamp member (32) and that the first clamp member (31) is pivoted in a direction towards and away from the other clamp member (32) by means of a hydraulic pressure cylinder (60), and that there is arranged a pair of inductive feeler means (64, 65) on each of the clamp members (31, 32), arranged just by an intermediate portion (37c) on a cooperating rail (37) or similar mounting means.

5. Arrangement in accordance with claim 4, characterized in that the first clamp member (31) is pivoted in a direction towards the other clamp member (32) by means of a compression spring (57) in addition to the hydraulic cylinder (60).

6. Arrangement in accordance with claims 4 or 5, characterized in that the catch claw (22), in addition to the first clamp member (31) and the other clamp member (32), which each form a support against the one side of the rail (37), is provided with a third clamp member (38) which forms a support against the opposite side of the rail (37) in order to clamp the rail (37) between the three clamp members (31, 32, 38).

7. Arrangement in accordance with claims 5 or 6, characterized in that the first clamp member (31) is designed as a two-branched lever which is pivotable about the transverse axis (31a) on the other clamp member (32), and that the compression spring (57) and the associated pressure cylinder (60) are inserted between a fastening on the other clamp member (32) and a fastening on the one lever branch (41b, 42b) of the first clamp member (31), and the third clamp member (38) is connected to said fastening on the other clamp member (32) and a fastening on the other clamp member (32) and a fastening on the other lever branch (41a, 42a) of the first clamp member (31) by means of a joint arm-forming support rods (51, 52; 54, 55), while the third clamp member (38) is preferably controlled via a telescopic control member towards and away from the transverse axis (31a) on the other clamp member (32).

* * * * *